(12) United States Patent
Molina

(10) Patent No.: US 11,091,041 B1
(45) Date of Patent: Aug. 17, 2021

(54) ELECTRIC SYSTEM FOR A MOTOR VEHICLE COMPRISING A SWITCHING MATRIX, AND MOTOR VEHICLE

(71) Applicant: Bayerische Motoren Werke Aktiengesellschaft, Munich (DE)

(72) Inventor: Vincent Molina, Mountain View, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/928,637

(22) Filed: Jul. 14, 2020

(51) Int. Cl.
*B60L 50/51* (2019.01)
*B60L 15/20* (2006.01)
*B60L 53/14* (2019.01)

(52) U.S. Cl.
CPC .............. *B60L 50/51* (2019.02); *B60L 15/20* (2013.01); *B60L 53/14* (2019.02); *B60L 2210/40* (2013.01)

(58) Field of Classification Search
CPC ...................................................... B60L 50/51
USPC ............................................................ 307/10.1
See application file for complete search history.

(56) References Cited

U.S. PATENT DOCUMENTS

| 2009/0167217 A1* | 7/2009 | Soma ...................... B60L 53/11 318/376 |
| 2011/0187184 A1* | 8/2011 | Ichikawa ................ B60L 53/14 307/10.1 |
| 2018/0118040 A1* | 5/2018 | Kim ........................ H02J 7/025 |

FOREIGN PATENT DOCUMENTS

| DE | 10 2014 004 790 A1 | 10/2015 |
| DE | 10 2017 218 067 A1 | 4/2019 |
| WO | WO 2010/130607 A2 | 11/2010 |

\* cited by examiner

*Primary Examiner* — Joseph Chang
(74) *Attorney, Agent, or Firm* — Crowell & Moring LLP

(57) ABSTRACT

A motor vehicle has an electric system that includes an inverter with load contacts for connecting a load at a first voltage, first and second battery contacts, and charging contacts for connecting a charging station that provides a higher second voltage. A switching matrix of the inverter includes inverter power switches and two additional switches directly connected to different ones of the inverter power switches. In a first switching state, the additional switches set the inverter to a driving mode for driving the load at the first voltage. In a second switching state, the additional switches set the inverter to a charging mode for charging the battery at the higher second voltage. For this purpose, the additional switches connect the first and second battery contacts in parallel in the driving mode and in series in the charging mode.

5 Claims, 4 Drawing Sheets

ELECTRIC SYSTEM FOR A MOTOR VEHICLE COMPRISING A SWITCHING MATRIX, AND MOTOR VEHICLE

BACKGROUND AND SUMMARY OF THE INVENTION

The present invention relates to an electric system for a motor vehicle comprising a switching matrix, and to a corresponding motor vehicle, in particular an electric car.

As electric, i.e. battery-powered, motor vehicles are being developed, different technical approaches and solutions, such as different voltages have been and are being used. Higher voltages can have the advantage of enabling faster charging of a battery and possibly providing more power to a motor. They do, however, often require specially adapted, usually more expensive components and equipment. Therefore, typically not every part of the electric systems of all vehicles and every external charging station or charging infrastructure will swiftly get updated to the highest technically feasible voltage, for example because of the associated cost and effort as well as it not being necessary for satisfactory performance in every use case. In other words, there is often a conflict of goals which can lead to technical and economic challenges with regards to designing and operating electric motor vehicles.

In this context, DE 10 2017 218 067 A1 describes a multi-voltage-storage system for a vehicle adapted to provide electrical power to a vehicle drive system. The storage system comprises a unit adapted to switch a first storage module and a second storage module in series for charging and to switch the storage modules in parallel for powering the vehicle. The storage system further comprises a control unit adapted to operate the drive system while the vehicle is standing still to reduce a voltage difference between the first and second storage modules.

As another approach, DE 10 2014 004 790 A1 discloses a method for operating an energy storage device that comprises two parallelly connected energy storage elements. If a charging condition is met, a switching device connects the first and second energy storage elements in series with an external energy source.

Another approach is disclosed in WO 2010/130 607 A2 in the form of a charging system and charging method for charging a battery of a vehicle. There, the objective is to enable charging a battery of a vehicle without a specially adapted external charging device. For this purpose, the charging system comprises an inverter, a switch unit, and a power supply charge connection. The inverter is connected to a battery and is used to convert direct current from the battery into a variable exchange current usable for an electric motor of the vehicle. The switch unit is connected to the alternating current side of the inverter and to the electric motor. The power supply charge connection is connected to the alternating current side of the inverter and to the switch unit and is used to connect an external current supply network to the inverter.

The approaches and solutions proposed so far do, however, typically require additional components and can therefore drive up cost and complexity.

It is an objective of the present invention to efficiently enable charging of a vehicle battery and a higher voltage. This can in particular refer to efficiency in terms of cost, needed additional parts or components, complexity, weight, and/or needed installation space. This objective is achieved by the subjects of the independent claims. Further advantageous embodiments and developments of the present invention are indicated in the dependent claims, the description, and in the drawing.

An electric system for a motor vehicle according to the present invention comprises a three-phase inverter. The inverter comprises electrical load contacts for connecting an electrical load of the respective vehicle, such as a drive unit or electric motor, operating at a first voltage to the three output phases of the inverter. The three output phases of the inverter refer to three output lines, contacts, or terminals of the inverter providing the three phases of an alternating current. The inverter further comprises first battery contacts and second battery contacts for connecting a battery that comprises multiple battery modules. For example, a first battery module of the battery can be electrically connected to the first battery contacts and a second battery module of the battery can be electrically connected to the second battery contacts. The first battery contacts can comprise a positive and a negative contact or terminal. The second battery contacts can also comprise a positive and a negative contact or terminal.

A battery module in this sense can be or comprise a single battery cell or multiple connected battery cells. In particular, a battery module can comprise multiple battery cells, such as lithium ion cells, connected in series to provide an increased voltage. The inverter further comprises electrical charging contacts for connecting an external charging station that provides a second voltage that is higher or greater than the first voltage. In other words, the electrical charging contacts are designed or adapted to receive the second voltage as a charging voltage for charging a battery connected to the battery contacts. Therein, this charging voltage, i.e. the second voltage, is greater than the first voltage that is provided as an output voltage at the load contacts and at which the load to be connected to the load contacts is operated.

The inverter further comprises a switching matrix comprising a set of inverter power switches arranged in three parallel pairs of series connected inverter power switches corresponding to the three phases. In other words, the set of inverter power switches makes up three series connections of two inverter power switches each, wherein these series connections are arranged or connected in parallel to each other. This can also be described as a parallel arrangement of three half-bridges with a respective junction point between the two inverter power switches of each pair of inverter power switches.

The switching matrix further comprises two additional switches that are directly connected to different ones of the inverter power switches and that in a first switching state or configuration set the inverter, in particular the switching matrix and thus also the whole electric system according to the present invention, to a driving mode for driving the load connected to the load contacts at the lower first voltage. In a different second switching state or configuration the two additional switches set the inverter to a charging mode for charging a battery connected to the first and second battery contacts at the higher second voltage. To achieve this, the two additional switches are arranged to connect the first and second battery contacts—and thus the multiple battery modules of the battery connected to the battery contacts—in parallel in the driving mode and in series in the charging mode. Here, two parts or components being directly connected means that there is a direct uninterrupted electrical line or connection between the two, i.e. no switch or the like is arranged between the two part or components.

The inverter is, in other words, configured so that in the first switching state of the additional switches the load can be driven or powered by the battery through the inverter with the parallel connection of the battery modules providing the lower first voltage. The inverter is further configured so that in the second switching state of the additional switches the battery can be charged at the higher second voltage with the serial or series connection of the battery modules providing the correspondingly larger voltage drop.

The additional switches can therefore also be called operating mode switches since they allow for switching between the driving mode and the charging mode. The additional switches are integrated within the inverter switching matrix and thus the existing electrical infrastructure besides the additional switches, in particular the inverter power switches and their connections or their corresponding circuitry, can be used in both operating modes, i.e. as part of the circuitry that is used for driving or powering the load from the battery through the inverter as well as for charging the battery. The present invention is, in other words, based on the insight that the switches or electrical infrastructure already available in a typical conventional inverter can be reused to efficiently and effectively allow for charging and driving at different voltages with minimal added parts, complexity, and cost. Using different voltages can simultaneously provide the advantages of shorter charging times due to the higher charging voltage and of cheaper and lighter drive system components, such as the electric motor, due to the lower driving voltage.

In a preferred example, exactly two battery modules are connected in parallel in the driving mode and correspondingly exactly two battery modules are connected in series in the charging mode. The second voltage can then be substantially twice as high as the first voltage. Similarly, any higher even number of battery modules can also be used, for example 4, 6, or 8 battery modules. Depending on the number of battery modules, a corresponding number of battery contacts or terminals can be provided.

Preferably, each of the three output phases of the inverter can be connected to a different junction point between the respective two inverter power switches of one of the pairs of inverter power switches.

Within the context of the present invention the term "switch" is to be understood in a broad sense. For example, such a switch can include one or more transistors, such as for example an IGBT or MOSFET.

Besides the inverter, the electric system according to the present invention can also comprise the load connected to the load contacts, in particular an electric motor, the battery connected to the battery contacts, and/or corresponding connections, connecting devices, interfaces, and/or the like.

In an advantageous development of the present invention, the electric system is dimensioned, i.e. adapted for a first voltage of substantially 400 V and a second voltage of substantially 800 V. Substantially generally means that these voltages can vary or differ, for example by up to 10%. While the invention can be used or adapted for different first and/or second voltages, the indicated values can effectively and efficiently enable realization of the mentioned advantages of short charging times and relatively cheap but still powerful enough components for driving or powering the respective motor vehicle.

In a further advantageous development of the present invention, the battery side of a first one of the additional switches is directly connected to one of the battery contacts and is connectable via one of the first pair of inverter power switches to the first output phase. A load side of the first additional switch is connectable via one of the third pair of inverter power switches to the first output phase. A battery side of the second one of the additional switches is connected to a different one of the battery contacts and is connectable via one of the second pair of inverter power switches to the second output phase. The load side of the second additional switch is connectable via the other one of the third pair of inverter power switches to the third output phase. A first and second one of the charging contacts are directly connected to the second and third output phases, respectively.

The battery side of a switch in this sense can in particular refer to the side or part of the switch that remains connected, in particular directly connected, to the respective battery contact even if the switch is opened. Correspondingly, the load side of the switch refers to the respective other side or part of the switch, in particular the side that is connected or connectable by means of a switch to one of the three output phases, i.e. to the load contacts. The configuration of the inverter and in particular of the switching matrix suggested here advantageously provides a particularly simple and low-complexity implementation for realizing the mentioned advantages of the present invention. For this configuration, both additional switches can be closed in the first switching state and open in the second switching state.

In a further advantageous development of the present invention, the charging contacts comprise three individual charging terminals, each of which is directly connected to a different one of the three output phases, i.e. to a different one of the corresponding three load contacts, to allow for AC-charging of the battery through the inverter. While for a purely DC-charging solution the electric system can comprise only two charging contacts, the additional third charging contact can advantageously provide additional flexibility since DC-charging as well as AC-charging can be used. For AC-charging the additional switches can also be set to the second switching state. In case of AC-charging the inverter power switches can operate as an AC/DC-converter.

An additional aspect of the present invention is a motor vehicle comprising an electric system according to the present invention, a battery comprising multiple battery modules electrically connected to a battery side of the inverter, i.e. to the battery contacts, and an electric drive motor electrically connected to a load side of the inverter, i.e.to the load contacts. The motor vehicle according to the present invention can be the motor vehicle referred to in conjunction with the electric system according to the present invention and can thus have any features or components mentioned in conjunction with the electric system according to the present invention. The battery of the motor vehicle according to the present invention can be configured as a traction battery of the vehicle. While the motor vehicle according to the present invention can be a car, it is not limited thereto and can also be a truck, a motorcycle, a compact vehicle, a rail vehicle, a plane, or the like.

Additional features and feature combinations of the invention can arise from the claims, the figures, and/or the description of the figures. The above-mentioned features and feature combinations as well as the features and feature combinations described below and/or shown only in the figures are applicable not only in the respective described or shown combinations but also in other combinations or each on their own without leaving the scope of the present invention.

Other objects, advantages and novel features of the present invention will become apparent from the following

BRIEF DESCRIPTION OF THE DRAWINGS

Identical and functionally identical elements are provided with the same reference signs in the figures.

DETAILED DESCRIPTION OF THE DRAWINGS

Figure 1:
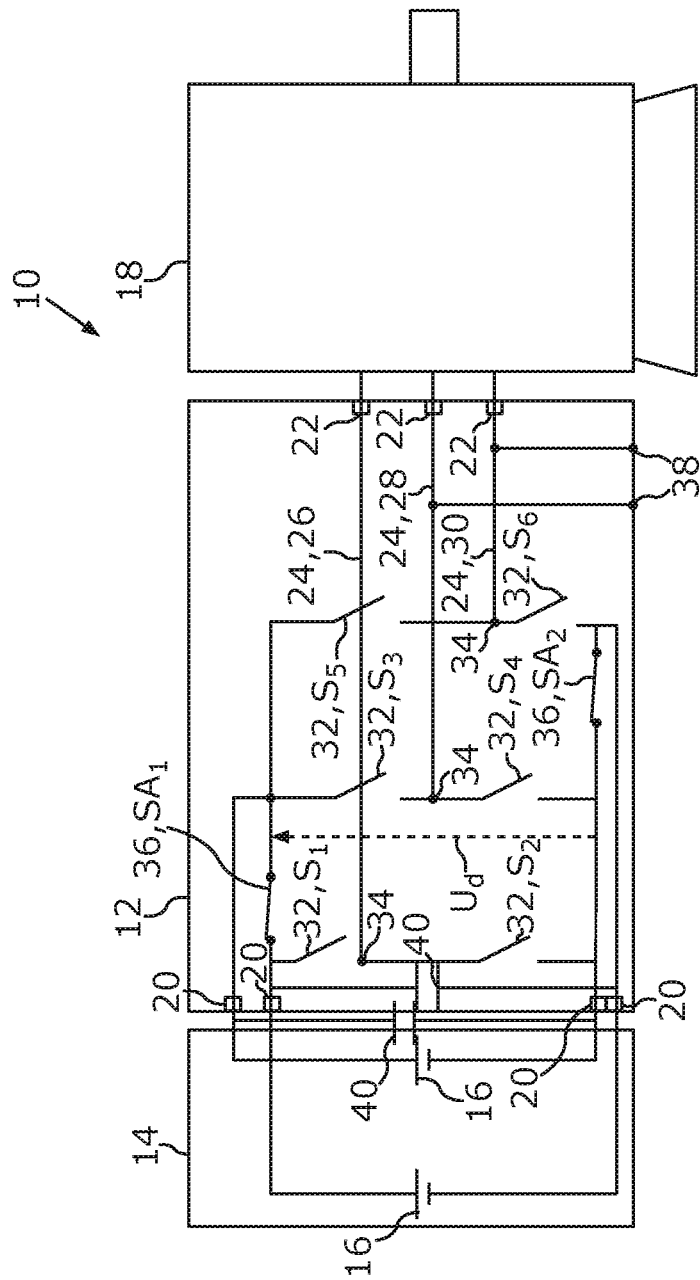
FIG. 1 is a schematic representation of an electric system comprising a battery and a motor both connected to an inverter in a driving configuration.

FIG. 1 schematically shows an electric system 10 comprising, as a central element, an inverter 12. The electric system 10 further comprises a battery 14 with multiple battery modules 16 as well as a load in the form of an electric motor 18. The battery 14 and the motor 18 are electrically connected to the inverter 12. For this purpose, the inverter 12 comprises multiple battery contacts 20 on its DC- or battery side and three load contacts 22 on its AC- or load side.

The load contacts 22 are internally connected to and supplied with power by three output phases 22, namely a first output phase 26, a second output phase 28, and a third output phase 30 of the inverter 12.

The inverter 12 further comprises a switching matrix which in this example is schematically made up of six inverter power switches 32 arranged in three parallel half-bridges, and two additional switches 36. Each of the half-bridges comprises two inverter power switches 32 connected in series with a respective junction point 34 in between them. These junction points 34 are directly connected to one of the output phases 24. Presently, the second output phase 28 and the third output phase 30 are also directly connected to charging contacts 38 of the inverter 12. Additionally, the electric system 10 comprises an intermediate circuit with two schematically indicated intermediate circuit capacitors 40, which are connected in parallel to the three half-bridges of inverter power switches 32.

Presently, the switching matrix of the inverter 12 is shown in a driving mode configuration with the battery modules 16 connected in parallel to drive the motor 18 at a first voltage, indicated here as driving voltage $U_d$. This driving voltage $U_d$ can for example be 400 V.

In this driving mode configuration of the switching matrix, both additional switches 36 are set to a first switching state. This means that the first additional switch $SA_1$ and the second additional switch $SA_2$ are closed. The inverter power switches 32, i.e. the first to sixth inverter power switches $S_1$ to $S_6$, are shown as open but can be switched between open and closed switching states as needed to provide power to the motor 18.

Figure 2:
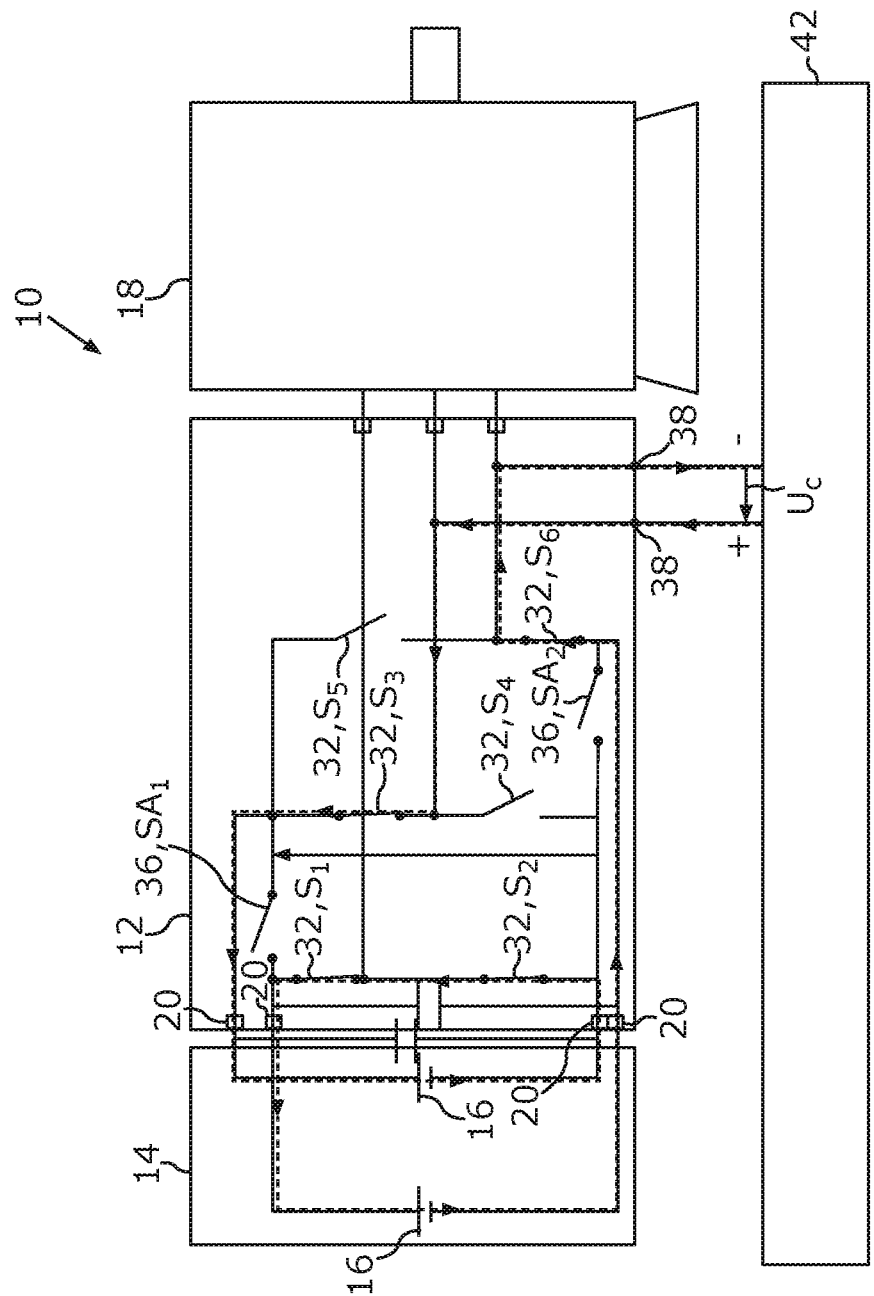
FIG. 2 shows the electric system in a DC-charging configuration and connected to a DC-charging station.

FIG. 2 shows the electric system 10 in a DC-charging setup or configuration. Here, an external DC-charging station 42 is connected to the charging contacts 38. The DC-charging station 42 provides a second voltage, indicated here as a charging voltage $U_c$. The charging voltage $U_c$ can be different from the driving voltage $U_d$, for example twice as high. This means that in the present example the charging voltage $U_c$ can be 800 V. For this DC-charging setup, i.e. for charging the battery 14 through the inverter 12 by means of the DC-charging station 42, the inverter 12 is put into a DC-charging mode. In this DC-charging mode and a corresponding DC-charging configuration of the switching matrix, both additional switches 36 are set to a second switching state. This means that the first additional switch $SA_1$ and the second additional switch $SA_2$ are open. Additionally, the first inverter power switch $S_1$, the second inverter power switch $S_2$, the third inverter power switch $S_3$, and the sixth inverter power switch $S_6$ are closed, while the remaining inverter power switches $S_4$ and $S_5$ are open. With this configuration the battery modules 16 are connected in series to provide the voltage drop corresponding to the higher charging voltage $U_c$. As further clarification, a DC-current path from and to the DC-charging station 42 through the electric system 10 is indicated by arrows. The remaining features of the electric system 10—such as for example the battery contacts 20 and the load contacts 22—correspond to the respective features as described in conjunction with FIG. 1 even if not explicitly indicated in FIG. 2. For simplicity's sake, the same applies to the schematic depiction of the electric system 10 in FIG. 3.

Figure 3:
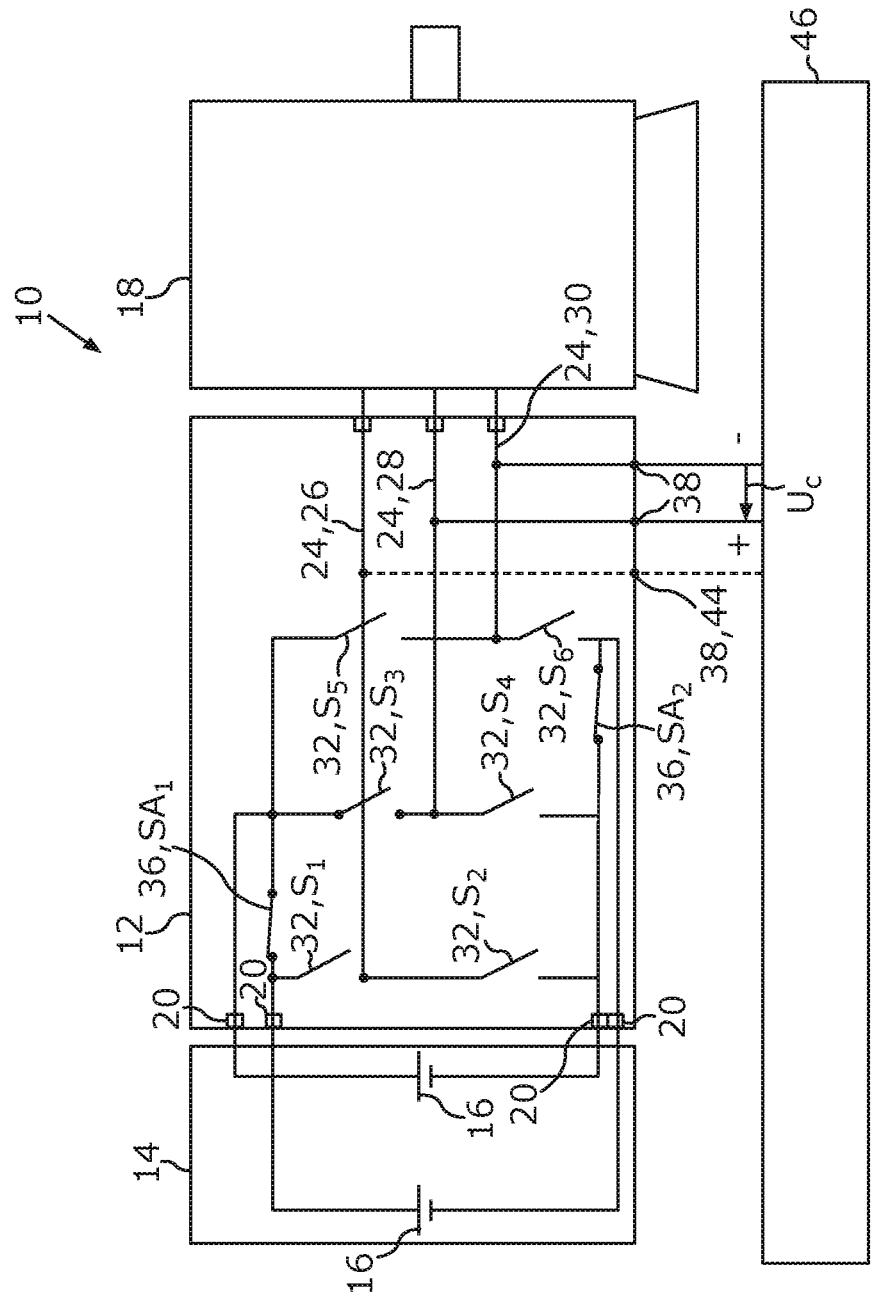
FIG. 3 shows the electric system in an AC-charging configuration and connected to an AC-charging station.

The electrical system 10 as schematically shown in FIG. 3 is set up for three-phase AC-charging of the battery 14 through the inverter 12. For this purpose, the inverter 12 comprises as part of the charging contacts 38 an additional third charging contact 44 that is directly connected to the first output phase 26. To charge the battery 14 in an AC-charging mode, an external AC-charging station 46 is electrically connected to the three charging contacts 38 and the switching matrix of the inverter 12 is set to an AC-charging mode or configuration as shown with all inverter power switches 32 open and both additional switches 36 closed, i.e. in the second switching state. The relatively simple and cheap addition of the third charging contact 44 thus enables using the inverter 12 as an AC/DC-converter. No separate dedicated AC-charger is then needed, which enables advantageous reductions in cost, weight, complexity, and needed installation space.

Figure 4:
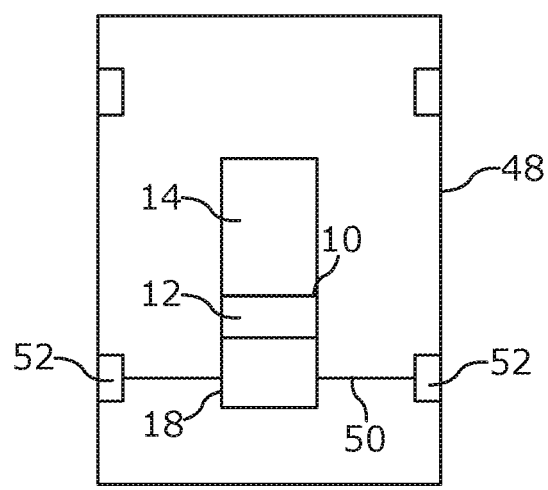
FIG. 4 is a schematic representation of a car comprising the electric system.

FIG. 4 schematically shows a motor vehicle 48 comprising the electric system 10. In this example, the battery 14 is a traction battery of the motor vehicle 48 and the motor 18 is set up as its drive motor connected to a drive axle 50 to ultimately drive wheels 52 of the motor vehicle 48.

LIST OF REFERENCE SIGNS 10 electric system
12 inverter
14 battery
16 battery modules
18 motor
20 battery contacts
22 load contacts
24 output phases
26 first output phase
28 second output phase
30 third output phase
32 inverter power switches
34 junction points
36 additional switches
38 charging contacts
40 intermediate circuit capacities
42 DC-charging station
44 third charging contact
46 AC-charging station
48 vehicle 50 drive axle
52 drive wheels
$S_1$-$S_6$ first to sixth inverter power switches
$SA_1$ first additional switch
$SA_2$ second additional switch
$U_d$ driving voltage
$U_c$ charging voltage The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric system for a motor vehicle, comprising:
    a three-phase inverter, the inverter comprising:
        electrical load contacts for connecting an electric load operating at a first voltage to the three output phases of the inverter,
        first battery contacts and second battery contacts for connecting a battery that comprises multiple battery modules,
        electrical charging contacts for connecting an external charging station that provides a higher second voltage, and
        a switching matrix comprising a set of inverter power switches arranged in three parallel pairs of series connected inverter power switches corresponding to the three phases, wherein
        the switching matrix further comprises two additional switches that are directly connected to different ones of the inverter power switches and that in a first switching state set the inverter to a driving mode for driving the load at the lower first voltage and that in a different second switching state set the inverter to a charging mode for charging the battery at the higher second voltage by connecting the first and second battery contacts in parallel in the driving mode and in series in the charging mode.

2. The electric system according to claim 1, wherein the electric system is dimensioned for a first voltage of 400 V and a second voltage of 800 V.

3. The electric system according to claim 1, wherein
    a battery side of a first one of the additional switches is directly connected to one of the battery contacts and is connectable via one of the first pair of inverter power switches to the first output phase, and a load side of the first additional switch is connectable via one of the third pair of inverter power switches to the third output phase,
    a battery side of the second one of the additional switches is directly connected to a different one of the battery contacts and is connectable via one of the second pair of inverter power switches to the second output phase, and a load side of the second additional switch is connectable via the other one of the third pair of inverter power switches to the third output phase, and
    a first and second one of the charging contacts are directly connected to the second and third output phases, respectively.

4. The electric system according to claim 1, wherein the charging contacts comprise three individual charging terminals, each of which is directly connected to a different one of the three output phases to allow for AC-charging of the battery through the inverter.

5. A motor vehicle, comprising:
an electric system according to claim 1;
a battery comprising multiple battery modules electrically connected to a battery side of the inverter; and
an electric drive motor electrically connected to a load side of the inverter.

* * * * *